United States Patent [19]
Seki et al.

[11] Patent Number: 5,444,831
[45] Date of Patent: Aug. 22, 1995

[54] DEVELOPED PRODUCT SHAPE DECIDING METHOD FOR A COMPUTER-AIDED DESIGN SYSTEM

[75] Inventors: Masaki Seki, Tokyo; Shizuaki Hayanagi, Yamanashi; Koji Suzuki, Yamanashi; Takeshi Hosono, Yamanashi, all of Japan

[73] Assignee: Fanuc Ltd., Minamitsuru, Japan

[21] Appl. No.: 998,247

[22] Filed: Dec. 30, 1992

Related U.S. Application Data

[63] Continuation-in-part of Ser. No. 566,471, filed as PCT/JP89/01235, Dec. 8, 1989, published as WO90/07748, July 12, 1990, abandoned.

[30] Foreign Application Priority Data

Dec. 24, 1988 [JP] Japan ............... 63-324794

[51] Int. Cl.⁶ ............................................. G06T 17/40
[52] U.S. Cl. .................... 395/127; 395/133; 395/136
[58] Field of Search .............. 395/119, 127, 133, 141, 395/120, 127, 134–139, 125, 155, 161

[56] References Cited

U.S. PATENT DOCUMENTS

| | | | |
|---|---|---|---|
| T 912,005 | 7/1973 | Appel et al. | 395/119 X |
| 4,860,217 | 8/1989 | Sasaki et al. | 382/44 X |
| 4,912,644 | 3/1990 | Aoyama et al. | 395/119 X |
| 5,003,498 | 3/1991 | Ota et al. | 395/120 |

OTHER PUBLICATIONS

Gurunathan, B. and Dhande, S. G., "Algorithms for development of certain classes of ruled surfaces", *Computers & Graphics*, vol. 11, No. 2, 1987, pp. 105–112.

Supplemental European Search Report, The Hague, Jul. 2, 1992.

*Primary Examiner*—Almis R. Jankus
*Attorney, Agent, or Firm*—Staas & Halsey

[57] ABSTRACT

The original planar shape or developed shape of a product to be manufactured by bending is determined using a computer-aided design system. An operator operates a tablet unit to prepare, first and second projection drawings of, e.g., an L-shaped product, projected onto two planes parallel to the outside of first and second sides of the product, with a bending line in common. The computer-aided design system displays the first and second projection drawings on a display screen in accordance with shape data which defines the two projection drawings (S1). In response to the operator picking two vertices of each projection drawing on the side of the bending line using the tablet unit (S2, S3), the processor calculates distances of movement in the X- and Y-axis directions and the rotational angle of the second projection drawing required for the alignment of the two sets of vertices (S5). Based on these calculated values and the amount of expansion or contraction of the product material accompanying the bending work, calculated in accordance with input data indicative of the thickness, bending angle, and bending direction, the processor prepares shape data indicative of the product shape prior to bending and causes the developed product shape to be displayed on the display screen (7).

14 Claims, 4 Drawing Sheets

DEVELOPED PRODUCT SHAPE DECIDING METHOD FOR A COMPUTER-AIDED DESIGN SYSTEM

This application is a continuation-in-part, of application Ser. No. 07/566,471, filed as PCT/JP89/01235, Dec. 8, 1989, published as WO90/07748, July 12, 1990, now abandoned.

FIELD OF THE INVENTION

The present invention relates to a method for deciding the developed shape of a product to be manufactured by bending, and more particularly, to a method of this kind capable of easily accurately obtaining the developed product shape by means of a computer-aided design system.

DESCRIPTION OF THE RELATED ART

As is generally known, the developed shape or pre-bending plane shape of a product manufactured by plate bending, e.g., a pressed product, can be obtained by developing projection drawings of the product on two or three planes, including a plane perpendicular to a bending line, on a graphic display screen of a computer-aided design system. In the case of a product with an L-shaped cross section, for example, a developed pattern F12' (FIG. 7) on an XZ plane, perpendicular to a bending line 11 and displayed on the display screen, is obtained by developing a projection drawing F12 (FIG. 6) of the product on the XZ plane along the bending line L11. Then, a developed product shape F11' (FIG. 8) is obtained by developing a projection drawing F11 on an XY plane so as to be in alignment with the developed pattern F12'.

Thus, in the conventional method of bending development, it is necessary to prepare the developed pattern by developing the projection drawing on the plane perpendicular to the bending line, and further to prepare the developed product shape on another plane on the basis of the developed pattern, which requires a troublesome work. According to the conventional method, moreover, it is difficult to execute an accurate bending development along a bending line L12 (FIG. 9) which is not parallel to a coordinate axis, e.g., X- or Y-axis, of a display coordinate system (coordinate system for projection drawing preparation), and the developed shape is liable to errors. In such a case, an operator used to modify the developed shape.

SUMMARY OF THE INVENTION

The object of the present invention is to provide a developed product shape deciding method for a computer-aided design system, which can easily accurately obtain the developed shape of a product to be manufactured by bending.

In order to achieve the above object, a developed product shape deciding method for a computer-aided design system, according to the present invention, comprises the steps of: (a) preparing a projection drawing of a product manufactured by bending on a plane parallel to a face of a one-side portion of the product with respect to a bending line; (b) preparing a projection drawing of the product on a plane parallel to a face of the other-side portion of the product with respect to the bending line; (c) calculating a relative movement of the two projection drawings required for alignment of two points on an outline of the projection drawing prepared in step (a) on the side of the bending line with two corresponding points on the projection drawing prepared in step (b); and (d) deciding the developed shape of the product on the basis of the relative movement.

According to the developed product shape deciding method, as described above, it is necessary only that the projection drawings on the planes parallel to the faces of the product portions on either side of the bending line, individually, be prepared, so that a projection drawing on a plane perpendicular to the bending line need not always be prepared, that is, the preparation of the projection drawings is easy. Further, the developed product shape is decided on the basis of the calculated relative movement of the two projection drawings required for the alignment of the two points on the outline of the product on the side of the bending line with the two points associated therewith. It is unnecessary, therefore, to decide the developed product shape on one projection drawing on the basis of a developed pattern obtained by bending another projection drawing, which is a troublesome work liable to errors. Thus, even if the bending line is parallel to neither of the coordinate axes, the developed product shape can be decided easily and accurately.

DESCRIPTION OF THE PREFERRED EMBODIMENT

Figure 1:
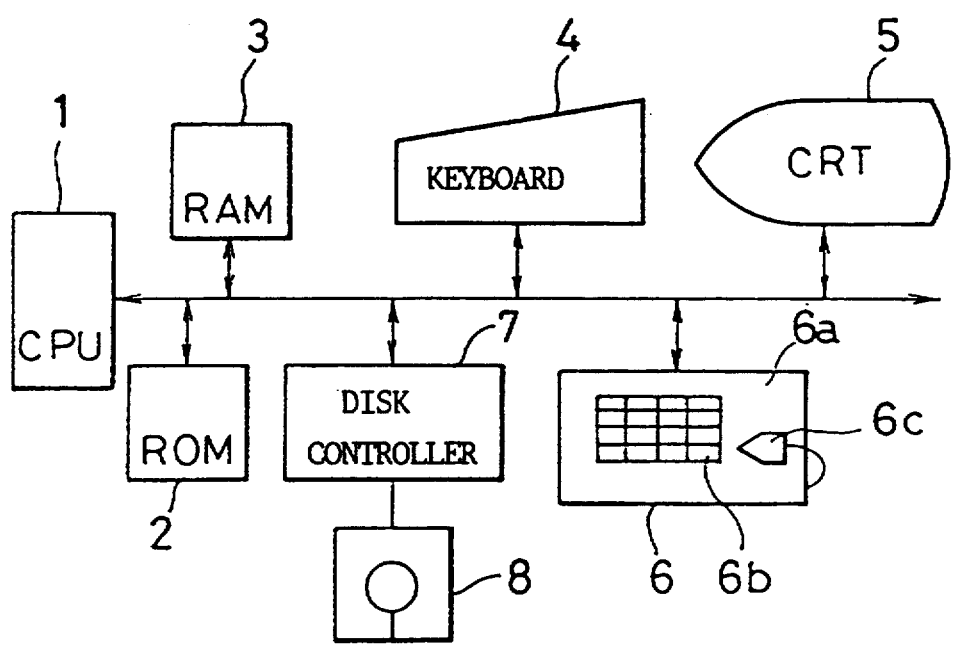
FIG. 1 is a schematic block diagram showing a computer-aided design system to which is applied a method according to one embodiment of the present invention.
Figure 2:
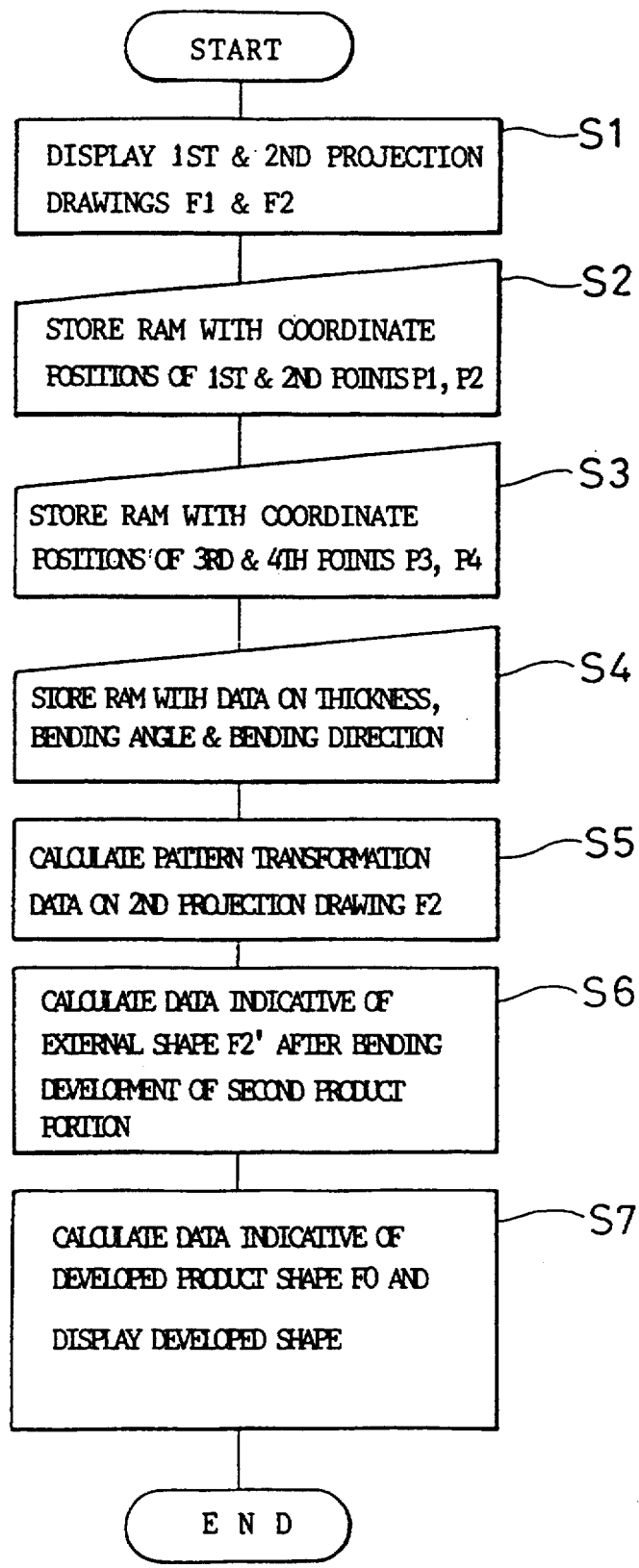
FIG. 2 is a flow chart illustrating a developed shape deciding process executed by the system of FIG. 1.

Referring to FIG. 1, a computer-aided design (CAD) system, to which is applied a method according to one embodiment of the present invention, comprises a processor (CPU) 1, a read-only memory (ROM) 2 stored with a program for controlling the CAD system, a random access memory (RAM) 3 for storing product shape data, a keyboard 4, a graphic display unit (CRT) 5, a tablet unit 6, a disk controller 7, and a floppy disk drive unit 8 connected to the controller 7. These elements 1 to 7 are connected to the CPU 1 by means of busses 9.

The tablet unit 6 is provided with a tablet cursor 6c for picking various items in a menu 6b displayed on a tablet panel 6a so that an operator can operate the tablet cursor 6c to pick required items, that is, the operator is allowed to input data. A graphic cursor of the CRT 5 is movable on the screen of the CRT in association with the tablet cursor 6c, so that the operator can locate the graphic cursor in a required position on the CRT screen by means of the tablet unit 6, and pick this position.

Referring now to FIGS. 2 to 5, the operation of the aforesaid CAD system will be described in connection with a ease in which the developed shape of a product with an L-shaped cross section manufactured by bending is obtained. In the description to follow, a one-side portion of the L-shaped product, with respect to a bending line, will be referred to as a first portion, while the other-side portion will be referred to as a second portion.

Figure 6:
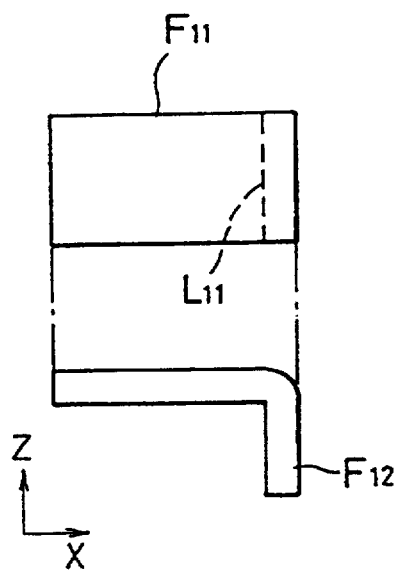
FIG. 6 is a diagram showing a projection drawing according to a conventional method.
Figure 8:
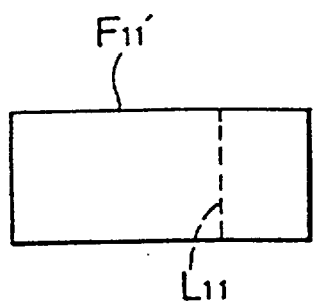
FIG. 8 is a diagram showing a developed product shape prepared by the conventional method on the basis of the developed pattern of FIG. 7.
Figure 7:
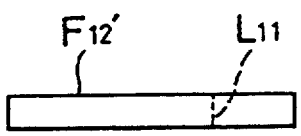
FIG. 7 is a diagram showing a developed pattern prepared by the conventional method on the basis of the projection drawing of FIG. 6.
Figure 9:
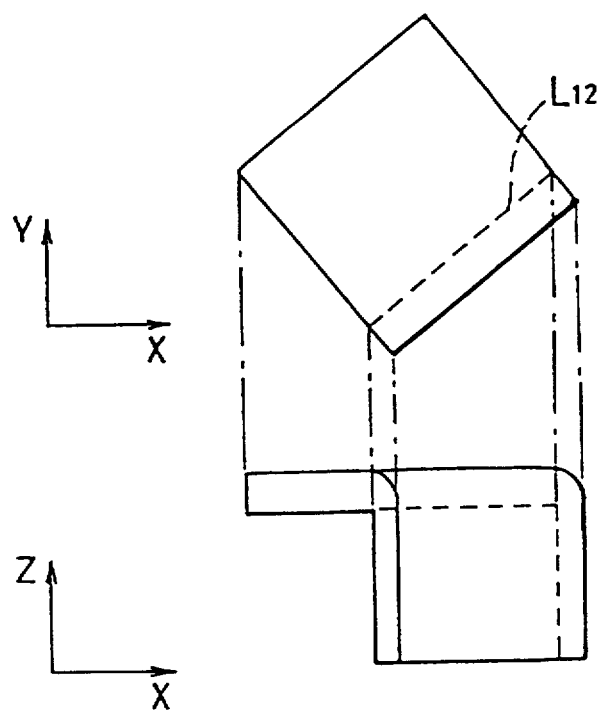
FIG. 9 is a diagram showing a projection drawing obtained when a bending line is parallel to neither of the X- and Y-axes.

The operator operates the tablet unit 6, thereby preparing two projection drawings (hereinafter referred to as first and second projection drawings F1 and F2) of the L-shaped product on two planes parallel to the outer flat surfaces of the first and second portions of the product, that is, two plan views taken individually in the directions (one of which is indicated by arrow A) of the respective normal lines of the outer surfaces of the first and second portions. Both these projection drawings F1 and F2 can be prepared more easily than a projection drawing (corresponding to a projection drawing F12 of FIG. 6) on a plane perpendicular to the bending line. If the projection drawings F1 and F2 are already prepared, the operator loads the floppy disk drive unit 8 with a floppy disk stored with shape data defining both these projection drawings.

Figure 3:
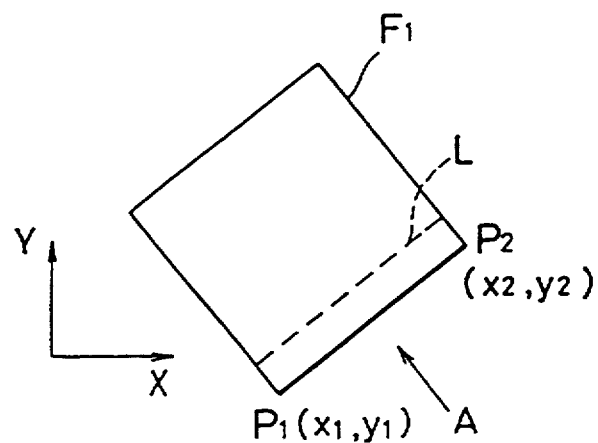
FIG. 3 is a diagram showing a projection drawing displayed on a display screen of the system of FIG. 1.
Figure 4:
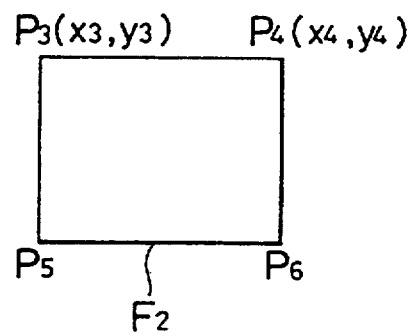
FIG. 4 is a diagram similar to FIG. 3, showing another projection drawing.
Figure 5:
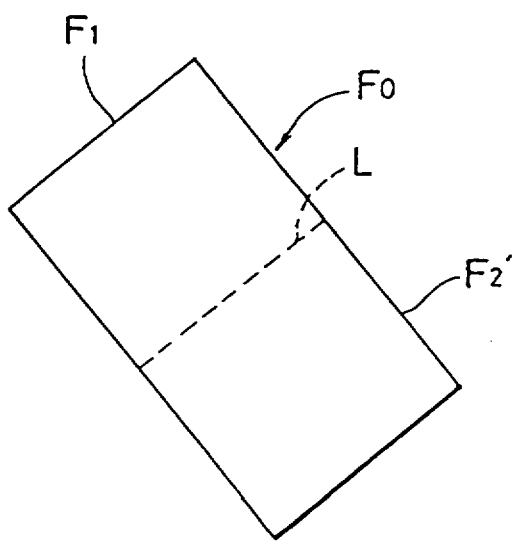
FIG. 5 is a diagram showing a developed product shape.

In response to the preparation of the first and second projection drawings F1 and F2 or the setting of the floppy disk, the CPU 1 stores the shape data defining the projection drawings F1 and F2 in the RAM 3. Then, the CPU 1 causes the first and second projection drawings F1 and F2 to be displayed individually on the screen of the CRT 5 in accordance with the shape data, as shown in FIGS. 3 and 4 (Step S1).

Then, the operator operates the tablet unit 6 to locate the graphic cursor, movable on the screen of the CRT 5 in association with the tablet cursor 6c, at one end (first point) P1 of an outline of the first projection drawing F1 on the side of the bending line L, that is, at one vertex of the rectangular projection drawing F1, thereby picking the point P1. The other end (second point) P2 is picked in like manner. In response to the picking of the first and second points P1 and P2, coordinate positions (x1, y1) and (x2, y2) in a coordinate system set on the CRT screen, indicative of the respective positions of the points P1 and P2 on the CRT screen, are stored in the RAM 3. Subsequently, when third and fourth points P3 and P4, which correspond individually to the opposite ends of an outline of the second projection drawing F2 on the side of the bending line L, are picked in the order named and in the same manner as the points P1 and P2, the respective coordinate positions (x3, y3) and (x4, y4) of the third and fourth points P3 and P4 are stored in the RAM 3 (Step S3). When the thickness, bending angle, and bending direction of the L-shaped product are inputted by the operator's operation, moreover, these data are stored in the RAM 3 (Step S4).

The CPU 1 calculates distances $\Delta x$ and $\Delta y$ of movement of the second projection drawing F2 in the X- and Y-axis directions, required for the alignment of the third point P3 with the first point P1, according to the following equations (1) and (2) (Step S5):

$$\Delta x = x3 - x1 \quad (1)$$

$$\Delta y = y3 - y1 \quad (2)$$

The coordinate position P4' (x4', y4') of the fourth point P4 of the projection drawing F2 after a parallel movement of the second projection drawing F2 based on the calculated distances $\Delta x$ and $\Delta y$ is given by the following equations (3) and (4):

$$x4' = x4 - \Delta x \quad (3)$$

$$y4' = y4 - \Delta y \quad (4)$$

If the rotational angle of the second projection drawing F2 required for the alignment of the coordinate position P4' of the fourth point after the aforesaid parallel movement with the second point is $\theta$, the following equation (5) holds:

$$\begin{bmatrix} x2 \\ y2 \end{bmatrix} = \begin{bmatrix} \cos\theta & -\sin\theta \\ \sin\theta & \cos\theta \end{bmatrix} \begin{bmatrix} x4' \\ y4' \end{bmatrix} \quad (5)$$

If the coordinate positions before the parallel movement and rotatory movement of the second projection drawing F2, based on the distances $\Delta x$ and $\Delta y$ of movement and the rotational angle $\theta$, are xi and yi, respectively, X- and Y-axis direction coordinate positions Xi and Yi (i=5, 6) of the two other vertexes, i.e., fifth and sixth points P5 and P6, of the projection drawing F2 after pattern transformation including the parallel and rotatory movements are given by the following equations (6) and (7):

$$Xi = xi \cdot \cos\theta - yi \cdot \sin\theta - \Delta x \quad (6)$$

$$Yi = xi \cdot \sin\theta + yi \cdot \cos\theta - \Delta y \quad (7)$$

Thereupon, in Step S5, the CPU 1 further calculates the rotational angle $\theta$ for aligning the fourth point with the second point and the coordinate positions of the fifth and sixth points P5 and P6 after the pattern transformation, according to equations (5) to (7).

Then, the CPU 1 calculates the amount of expansion or contraction of the product material accompanying the bending work, in accordance with input data indicative of the bending angle and the bending direction. In consideration of this calculated amount of expansion or contraction and on the basis of the calculated coordinate positions of the third to sixth points P3 to P6 of the second projection drawing F2 after the pattern transformation of the projection drawing F2, the CPU 1 calculates shape data indicative of an external shape F2' after the bending development of the second portion of the product (Step S6). Subsequently, the CPU 1 prepares shape data indicative of a product shape (developed product shape) F0 after the bending development on the basis of the shape data indicative of the first projection drawing F1 and the shape data indicative of the shape F2', and the CRT 5 displays the developed product shape F0 on the CRT screen in accordance with the prepared shape data, and also displays the bending line L in broken line so that the operator can discriminate it from the developed product shape F0 (Step S7).

The present invention is not limited to the embodiment described above, and various modifications may be effected therein.

In the above embodiment, for example, the opposite ends P1 to P4 of the outlines of the first and second projection drawings on the bending-line side are picked.

Alternatively, however, two points on the outline of the first projection drawing on the bending-line side and their corresponding two points on the second projection drawing may be picked. Further, two outlines to be aligned by pattern transformation may be simply specified. In this case, the coordinate positions of two sets of points on the two outlines are determined in accordance with projection drawing display data stored in the RAM 3.

Although the product with an L-shaped cross section has been described in connection with the above embodiment, furthermore, the present invention may be applied to products in various shapes.

What is claimed is:

1. A method for determining an original planar shape of a finished product formed by bending the original planar shape, the finished product having at least two sides, said method comprising the steps of:
   (a) storing, on a computer-aided design system, a representation of a first view of the finished product projected onto a first plane parallel to a first side of the finished product;
   (b) storing, on the computer-aided design system, a representation of a second view of the finished product projected onto a second plane parallel to a second side of the finished product, the first and second sides having a bending line in common;
   (c) calculating a relative movement required to align the bending line in the first view with the bending line in second view; and
   (d) generating the original planar shape in dependence upon the relative amount of movement calculated in step (c).

2. A method as recited in claim 7, wherein said calculating in step (c) calculates movement of one of the first and second views relative to the other.

3. A method as recited in claim 1, further comprising the step of (e) simultaneously displaying the first and second views using a graphic display screen of the computer-aided design system.

4. A method as recited in claim 3, further comprising the step of (f) displaying, on the computer-aided design system, the original planar shape and the bending line.

5. A method for determining an original planar shape of a finished product formed by bending the original planar shape, the finished product having at least two sides, said method comprising the steps of:
   (a) storing, on a computer-aided design system, a representation of a first view of the finished product projected onto a first plane parallel to a first side of the finished product, using a two-dimensional coordinate system having coordinate axes;
   (b) storing, on the computer-aided design system, a representation of a second view of the finished product projected onto a second plane parallel to a second side of the finished product, using the two-dimensional coordinate system, the first and second sides having a bending line in common;
   (c) calculating a relative movement of one of the first and second views relative to the other required to align the bending line in the first view with the bending line in second view, said calculating including the steps of:
      (c1) calculating a rotational angle between the first and second views; and
      (c2) calculating distances of movement parallel to the coordinate axes of the two-dimensional coordinate system; and
   (d) generating the original planar shape in dependence upon the relative amount of movement calculated in step (c).

6. A method for determining an original planar shape of a finished product formed by bending the original planar shape, the finished product having at least two sides, said method comprising the steps of:
   (a) storing, on a computer-aided design system, a representation of a first view of the finished product projected onto a first plane parallel to a first side of the finished product;
   (b) storing, on the computer-aided design system, a representation of a second view of the finished product projected onto a second plane parallel to a second side of the finished product, the first and second sides having a bending line in common;
   (c) designating coordinates of intersections of the bending line with two other edges of the finished product in each of the first and second views;
   (d) calculating a relative movement required to align the bending line in the first view with the bending line in second view using the coordinates designated in step (c);
   (e) generating the original planar shape in dependence upon the relative amount of movement calculated in step (d).

7. A computer-aided design system, comprising:
   a storage unit for storing first and second projection views of a product manufactured by bending an original object having a planar shape, the first and second projection views representing projections onto first and second planes parallel to first and second sides, respectively, of the product, the first and second sides having a bending line in common; and
   a processor, operatively connected to said storage unit, for evaluating an amount of transformation of the second projection view required to align the bending line in the first projection view with the bending line in the second projection view to determine the planar shape of the original object and for storing the planar shape in said storage unit.

8. A computer-aided design system as recited in claim 7, wherein said display unit displays the planar shape and the bending line after said processor stores the planar shape in said storage unit.

9. A computer-aided design system, comprising:
   a storage unit for storing first and second projection views of a product manufactured by bending an original object having a planar shape, the first and second projection views representing projections onto first and second planes parallel to first and second sides, respectively, of the product, the first and second sides having a bending line in common;
   a display unit for displaying the first and second projection views in a two-dimensional coordinate system;
   designating means for designating end points of the bending line in each of the first and second projection views
   a processor operatively connected to said storage unit and said display unit, for evaluating an amount of transformation of the second projection view required to align the bending line in the first projection view with the bending line in the second projection view to determine the planar shape of the original object by calculating distances between corresponding end points in the two-dimensional coordinate system of the display unit and a rotational angle between the bending line in the first view and the bending line in the second view and for storing the planar shape in said storage unit.

10. A computer-aided design system as recited in claim 9, wherein said designating means is a tablet unit operatively connected to said processor.

11. A method for determining an original shape of a workpiece having two planar surfaces and a thickness from a finished product formed by bending the workpiece to produce at least two sides on the finished product, said method comprising the step of:

(a) inputting into a data processing apparatus a representation of a first projection of the finished product onto a first plane parallel to a first side of the finished product;

(b) inputting into the data processing apparatus a representation of a second projection of the finished product onto a second plane parallel to a second side of the finished product, the first and second sides having a bending line in common;

(c) inputting the thickness of the workpiece into the data processing apparatus;

(d) calculating a relative movement required to align the bending line in the first projection with the bending line in the second projection and an amount of expansion and contraction of the planar surfaces of the workpiece when the workpiece was bent to form the finished product; and (e) generating a representation of the original shape of the workpiece in dependence upon said calculating in step (d).

12. A method as recited in claim 11,
wherein said inputting in step (c) further includes inputting a bending angle and a bending direction of the first and second sides at the bending line, and
wherein said calculating in step (c) uses the bending angle and bending direction in addition to the thickness to determine the expansion and contraction of the workpiece during bending.

13. A method as recited in claim 12,
wherein said inputting in steps (a) and (b) uses a two-dimensional coordinate system having coordinate axes, and
wherein said calculating in step (d) includes the steps of:

(d1) calculating a rotational angle between the first and second projections; and (d2) calculating distances of movement parallel to the coordinate axes of the two-dimensional coordinate system.

14. A data processing system, comprising:
input means for inputting a thickness of a workpiece having an original shape with two planar sides, and first and second projections onto first and second planes parallel to first and second sides, respectively, of a product manufactured by bending the workpiece, the first and second sides having a bending line in common; and
a processor, operatively connected to said input means, for calculating an amount of transformation of the second projection required to align the bending line in the first projection with the bending line in the second projection and an amount of expansion and contraction of the workpiece during bending to determine the original shape of the workpiece.

* * * * *

UNITED STATES PATENT AND TRADEMARK OFFICE
CERTIFICATE OF CORRECTION

PATENT NO. : 5,444,831
DATED : August 22, 1995
INVENTOR(S) : Masaki SEKI et al.

It is certified that error appears in the above-indentified patent and that said Letters Patent is hereby corrected as shown below:

Column 3, line 5, delete "ease" and insert --case--.

Column 5, in Claim 2, line 34, change "7" to --1--.

Signed and Sealed this

Ninth Day of January, 1996

Attest:

Attesting Officer

BRUCE LEHMAN

Commissioner of Patents and Trademarks